Figure 1:
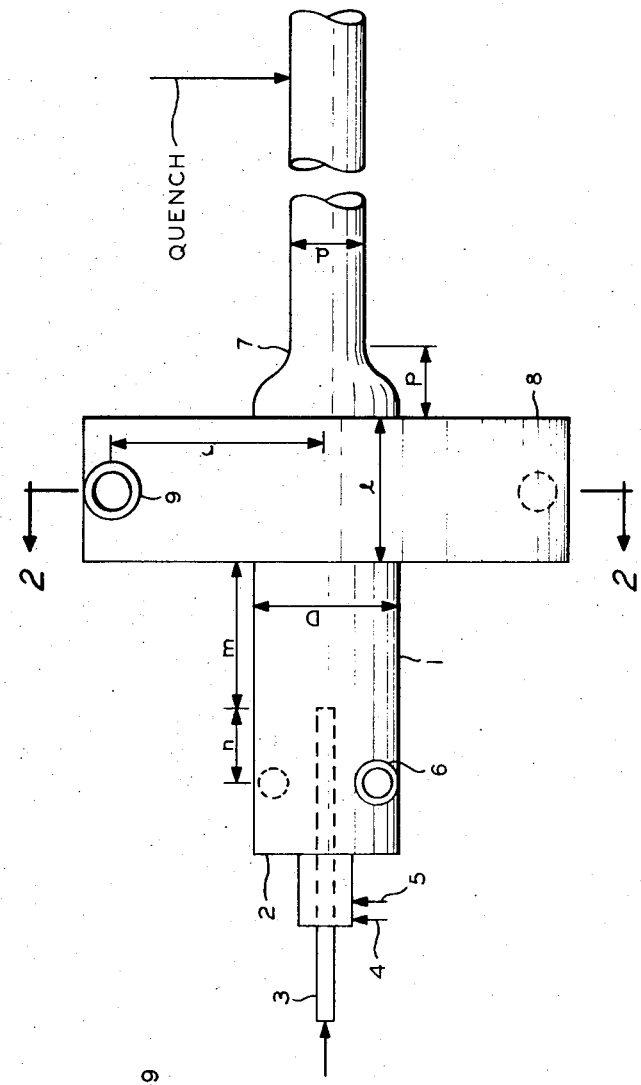

United States Patent [19]
Vanderveen

[11] 3,728,437
[45] Apr. 17, 1973

[54] CARBON BLACK PRODUCTION
[75] Inventor: John W. Vanderveen, Bartlesville, Okla.
[73] Assignee: Phillips Petroleum Company, Bartlesville, Okla.
[22] Filed: Feb. 16, 1971
[21] Appl. No.: 115,539

[52] U.S. Cl. ............... 423/450, 23/259.5, 423/456
[51] Int. Cl. ............................................. C09c 1/50
[58] Field of Search ................. 23/209.4, 259.5, 23/277; 423/450, 456

[56] References Cited

UNITED STATES PATENTS

| | | | |
|---|---|---|---|
| 3,076,695 | 2/1963 | Claassen et al. | 23/209.4 |
| 3,582,277 | 6/1971 | Kraus | 23/209.4 |
| 3,607,065 | 9/1971 | Forseth et al. | 23/209.4 |
| 3,595,622 | 7/1971 | Johnson | 23/259.5 |

*Primary Examiner*—Edward J. Meros
*Attorney*—Young and Quigg

[57] ABSTRACT

Method and apparatus for producing carbon black in which a first mass of hot combustion gases containing hydrocarbon feed is passed centrally and counter currently to a second mass of hot helically-flowing combustion gases whereby the hydrocarbon feed is pyrolytically decomposed to carbon black which is removed from the downstream end of the reactor and a portion of the hot combustion gases substantially free of carbon black are removed through ports in the upstream end of the reactor.

8 Claims, 1 Drawing Figure

PATENTED APR 17 1973

3,728,437

INVENTOR.
J. W. VANDERVEEN

BY

*Young & Quigg*

ATTORNEYS

CARBON BLACK PRODUCTION

This invention relates to carbon black production.

In one of its more specific aspects, this invention relates to a method and to apparatus for producing carbon black.

Carbon black is produced by pyrolytically decomposing a hydrocarbon feed by contacting it with hot combustion gases produced by the oxidation of a fuel. The carbon black and the products of combustion resulting from the oxidation of some portion of the fuel and feed are recovered from the reactor as smoke, usually after being water-quenched, and the smoke is filtered to recover the carbon black therefrom.

The economics of production are influenced by the quantity of smoke produced inasmuch as this affects the quantity of quench required and the magnitude of the filtration operation. The method of this invention affects the economics of production by reducing both of these.

According to this invention there is provided a method of producing carbon black which comprises passing a mass comprising hydrocarbon feed centrally of, and countercurrently to, a mass of hot helically-flowing combustion gases to transfer the heat from the hot combustion gases to the feed to pyrolytically decompose the feed to form carbon black, and recovering the carbon black.

Also, according to this invention there is provided a carbon black reactor comprising a feed inlet end and a carbon black recovery end, the carbon black recovery end being adapted with inlet means for hot combustion gases proximate thereto. The dimensions of the reactor, as hereinafter defined, are such as to establish the flow of the feed countercurrently to the helical flow of the hot combustion gases through the reactor.

The method of this invention can be employed using conventional hydrocarbon feeds, oxidants such as air, fuels such as natural gas and the like. The invention is also employed at conventional operating conditions of temperature, pressures, air to oil ratios, fuel rates, hot combustion gas rates, and the like, such operating conditions involving temperatures of from about 2,300° to about 2,800° F., and air to oil ratios, SCF/gallon, of from about 300 to about 1,100. It is operable in reactors in which there can be established a counterflow between a mass comprising pyrolytically-decomposing hydrocarbon feed and a mass comprising hot combustion gases which raise and maintain the hydrocarbon feed at its decomposition temperature. While some intermixing between these two masses occurs, it is desirable to maintain such intermixing at a minimum.

Figure 2:
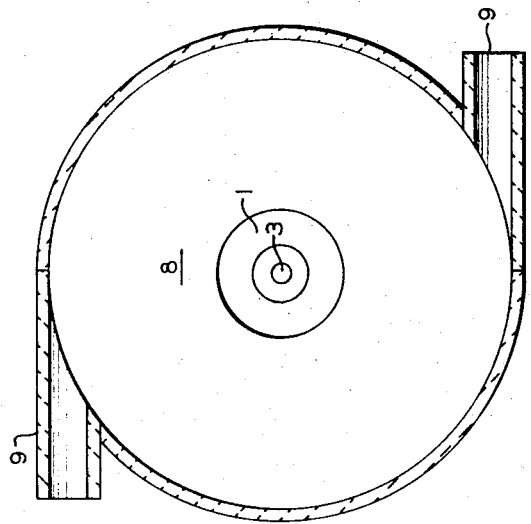

This invention will be more easily understood if explained in conjunction with the attached drawings in which FIG. 1 illustrates one embodiment of the reactor of the present invention in elevation while FIG. 2 is a cross-sectional view of the reactor through section 2–2 of FIG. 1.

Referring now to FIG. 1, reactor 1, substantially circular in cross section, is shown as having a feed inlet end 2 through which feed, some fuel and an oxidant, preferably air, are introduced by means of conduits 3, 4 and 5, respectively. Feed conduit 3 extends for a distance downstream from the upstream end of the reactor and beyond combustion gas exit ports 6 for a distance $n$.

At its downstream end, the reactor is adapted with a product recovery outlet 7 through which smoke is recovered. Outlet 7 is formed by concentrically reducing the reactor from its diameter D to a diameter $d$.

Positioned upstream of outlet 7 is combustion gas inlet section 8. This section is of an enlarged diameter and of a length $l$. It is adapted with a plurality of combustion gas inlets 9 which discharge tangentially into section 8. Any suitable number of combustion gas inlets can be supplied and these can be of circular and, preferably, of rectangular configuration. Section 8 will be positioned in peripheral communication with that section of the reactor of diameter D and with the internal surface of its downstream wall at a distance $p$ from the entrance into outlet 7. Its gas inlet ports 9 will be positioned a distance $r$ from the axial center line of the reactor. The internal surface of its upstream wall will be positioned at a distance $m$ from the outlet of feed conduit 3.

As mentioned, ports 6 are positioned proximate the feed inlet end of the reactor. These ports can be formed as apertures in the reactor wall at a section having a diameter D or they can be formed in an enlarged section of the reactor comparable to section 8. Preferably, the outlets are positioned to discharge substantially tangentially from the reactor so as to minimize turbulence. A plurality of these ports can be provided. Suitable provision is made downstream of outlet 7 for quenching the exiting smoke.

In carrying out the method of this invention, the hydrocarbon feed, and from about 5 to about 35 percent of the total volume of fuel and oxidant, or the equivalent in total hot combustion gases required, are introduced into the reactor at its feed inlet end. It will be understood that in all instances when hot combustion gases or the combination of a fuel and an oxidant are mentioned herein, either can be employed and the terms are employed interchangeably.

The remainder of the fuel and oxidant, or the equivalent in hot combustion gases, are introduced as "downstream air" and "downstream fuel" or as "downstream combustion gases" through ports 9 of section 8. Because of the dimensions of the reactor which establish certain pressure drops in relation to the quantities flowing, the mass comprising the hydrocarbon feed flows substantially as a core down the central portion of the reactor and the mass comprising hot combustion gas flows in a substantially helical path countercurrent to the mass of hydrocarbon feed. Heat is transferred from the combustion gases to the mass of hydrocarbon feed and this heat, in conjunction with that heat produced from the oxidation of that fuel or hot combustion gases introduced at the feed inlet end of the reactor and flowing cocurrently with the feed is sufficient to pyrolytically decompose the hydrocarbon feed. The carbon black in the smoke in which it is produced is recovered from outlet 7. A principal portion of the hot combustion gases, substantially free of carbon black, is removed from the reactor through ports 6.

It will be seen that in the practice of this invention, the quantity of smoke is substantially reduced as are the costs of quenching it and filtering the carbon black from it.

To establish the flows required for the operation of this invention the following dimensional relations will exist in relation to D, D being the substantially uniform diameter of the reactor over that length in which the principal contact between the hydrocarbon feed and the countercurrent-flowing combustion gases is made:

$d$, the diameter of the outlet from the reactor, is from about D/4 to about 3D/4;

$p$, the distance from the internal surface of the downstream wall of the combustion gas inlet section to the outlet conduit of diameter $d$, is from about D/2 to about 4D;

$l$, the length of the combustion gas inlet section, is from about D/4 to about 2D;

$r$, the distance from the longitudinal axis of the reactor to the center line of the combustion gas inlets, is from about 2D/3 to about 4D;

$n$, the distance from the center line of the hot combustion exit ports proximate the feed inlet to the locus of introduction of the hydrocarbon feed, is from about D/2 to about 4D; and, $m$, the distance from the internal surface of the upstream wall of the combustion gas inlet section to the locus of introduction of the hydrocarbon feed, is from about D to about 8D.

In its preferred embodiment, $d$ is D/2, $p$ is D/2, $l$ is D, $r$ is 3D/2, $n$ is D/2, and $m$ is D.

In order to establish the countercurrent flows within the reactor certain flow relationships between the masses will exist. Generally, the ratio of the volume of the core-flowing mass comprising the hydrocarbon feed, oxidant, and fuel to the volume of the helically-flowing mass comprising hot combustion gases will be from about 1 to 3 to about 1 to 20, depending upon the dimensions of the reactor employed, considering all materials as gases and the volumes concerned being considered at the operating conditions at which they are flowing. Variations within this range can be made, not only to affect the amount of heat transfer between the masses, but also to effect the properties of the carbon black produced.

As mentioned, the method and apparatus of this invention result in an appreciable reduction in the volume of smoke. This is shown by the following runs conducted under substantially identical operating conditions and substantially identical reactors except in respect to the employment of the method and apparatus of this invention. Data were as follows:

| | Prior art | invention |
|---|---|---|
| Feed Rate, GPH | 300 | 300 |
| "Upstream" Tangential Air, SCFH | 170,000 | 0 |
| "Upstream" Tangential Methane, SCFH | 13,600 | 0 |
| Axial Air, SCFH | 0 | 20,000 |
| Axial Methane, SCFH | 0 | 1,600 |
| "Downstream" Tangential Air, SCFH | 0 | 150,000 |
| "Downstream" Tangential Methane, SCFH | 0 | 12,000 |
| Smoke Production, SCFH | 200,000 | 100,000 |
| Water Quench Requirement, GPH | 800 | 410 |
| Carbon Black Production, No/gal. | 3.8 | 3.5 |

It will be seen from the above that while not all of the air and methane introduced downstream leave the reactor proximate the feed inlet end, a principal portion does exit therefrom. Depending upon the conditions of operation, these gases can contain quantities of combustible materials which can be burned to further optimize the operation or these hot gases can be passed to exchange heat with the incoming reactants to preheat them, or can be passed in contact with pelleted black to dry the pellets, or otherwise recovered.

It will be evident that various modifications can be made to the method of this invention. Such are considered, however, to be within the scope of the invention.

What is claimed is:

1. A method of producing carbon black by the pyrolytic decomposition of a hydrocarbon feed which comprises:
   a. introducing hydrocarbon feed, fuel and an oxidant axially into the upstream section of a reactor having a substantially uniform diameter D, said hydrocarbon feed being introduced at a distance m upstream from the internal surface of the upstream wall of an after-defined combustion gas inlet section, m being within the range of from about D to about 4D;
   b. oxidizing said fuel with said oxidant to form from about 5 to about 35 percent of the total hot combustion gases passed through said reactor and to produce a first reactant mass comprising said hydrocarbon feed;
   c. introducing hot combustion gases into said reactor through the external periphery of a combustion gas inlet section to form a second reactant mass, said combustion gas inlet section being formed of an upstream wall and a downstream wall spaced apart at a distance $l$, $l$ being within the range of from about D/4 to about 2D, the internal surface of said downstream wall being positioned a distance $p$ upstream from an after-defined carbon black outlet conduit having a diameter $d$ and opening from said reactor, $p$ being within the range of from about D/2 to about 4D and $d$ being within the range of from about D/4 to 3D/4, said hot combustion gases being introduced into said combustion gas inlet section at a distance r radially outward from the longitudinal axis of said reactor, r being within the range of from about 2D/3 to about 4D;
   d. passing said first and said second reactant masses through said reactor in substantially opposite directions, said second reactant mass being passed in a helical path peripheral to and in contact with said first reactant mass to heat said hydrocarbon feed to its decomposition temperature and to form carbon black, the ratio of the volume of said first reactant to the volume of the second reactant mass being within the range of from about 1 to 3 to about 1 to 20;
   e. removing hot combustion gases from said reactor at a locus positioned a distance n upstream of the locus of introduction of said hydrocarbon feed into said reactor, $n$ being within the range of from about D/2 to about 4D; and,
   f. recovering said carbon black from said reactor through said carbon black outlet conduit.

2. The method of claim 1 in which $d$ is equal to D/2, p is equal to D/2, $l$ is equal to D, $r$ is equal to 3D/2, n is equal to D/2 and m is equal to D.

3. The method of claim 1 in which the hot combustion gases of said first reactant mass comprise about 5 to about 35 percent of the total hot combustion gas flowing through said reactor.

4. The method of claim 1 in which a principal portion of the hot combustion gases comprising said second reactant mass is removed from said reactor upstream of the locus of introduction of said hydrocarbon feed.

5. The method of claim 1 in which the hot combustion gases removed from said reactor upstream of the locus of introduction of said hydrocarbon feed are removed from an enlarged section of said reactor.

6. A carbon black reactor which comprises:
   a. an elongated cylindrical housing closed at its ends and having a substantially uniform diameter D;
   b. conduit means for the introduction of hydrocarbon feed opening into said housing proximate its upstream end;
   c. conduit means for removing carbon black opening from said housing at its downstream end, said conduit means having a diameter $d$;
   d. conduit means for the removal of hot combustion gases opening from said housing at a distance $n$ upstream from the locus of discharge of said conduit means for the introduction of hydrocarbon feed;
   e. an enclosed section in peripheral communication with said housing and having a diameter greater than D and having a length $l$ and positioned proximate said downstream end of said housing upstream of said conduit means for removing carbon black, the inner upstream wall of said section being positioned a distance $m$ from the locus of discharge of said conduit means for the introduction of hydrocarbon feed, the inner downstream wall of said section being positioned a distance $p$ from said conduit means for removing carbon black;
   f. conduit means for the introduction of hot combustion gases opening into said enclosed section at a distance $r$ from the longitudinal axis of said housing, in which reactor: $d$ has a value of from about D/4 to about 3D/4; $n$ has a value of from about D/2 to about 4D; $m$ has a value of from about D to about 8D; $l$ has a value of from about D/4 to about 2D; $r$ has a value of from 2D/3 to about 4D; and, $p$ has a value of from about D/2 to about 4D.

7. The reactor of claim 6 in which $d$ has a value of about D/2, $p$ has a value of about D/2, $l$ has a value of about D, $r$ has a value of about 3D/2, $n$ has a value of about D/2, and $m$ has a value of D.

8. The reactor of claim 6 in which said conduit means for the removal of hot combustion gases is adapted to discharge tangentially from said housing.

* * * * *